Dec. 30, 1958 E. W. FORKNER 2,866,505
PRESSES FOR PUNCHING AND BLANKING SHEET METAL
Filed April 27, 1953 3 Sheets-Sheet 1
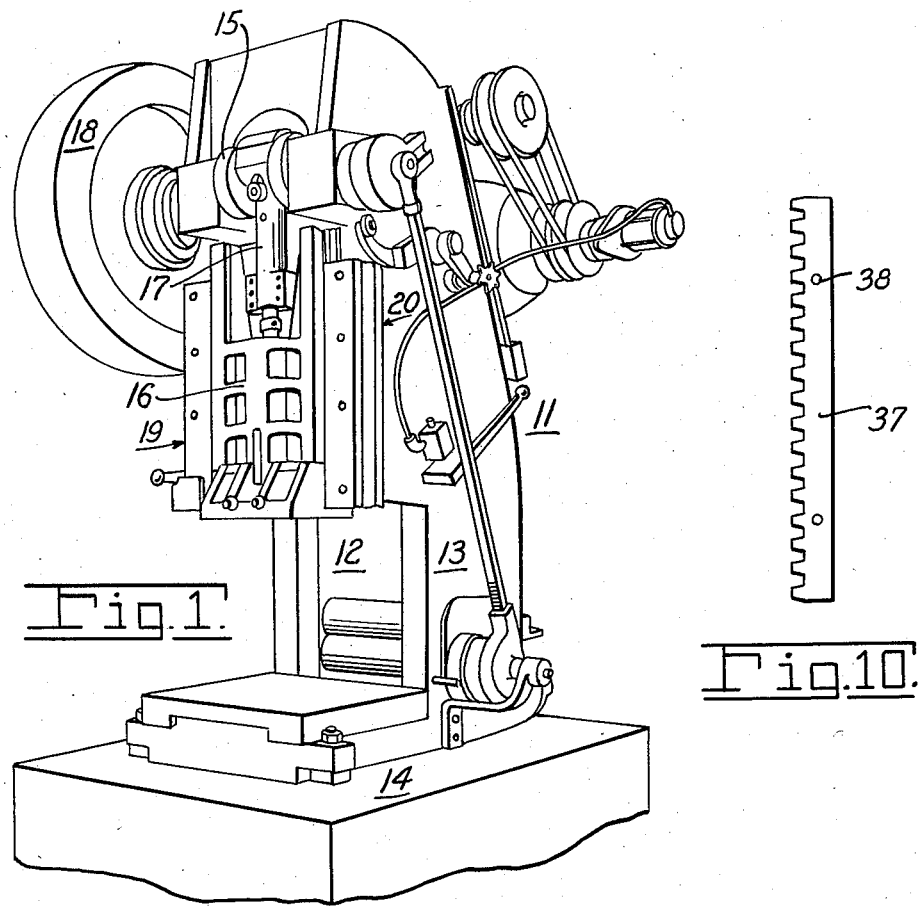
Fig. 1.
Fig. 10.
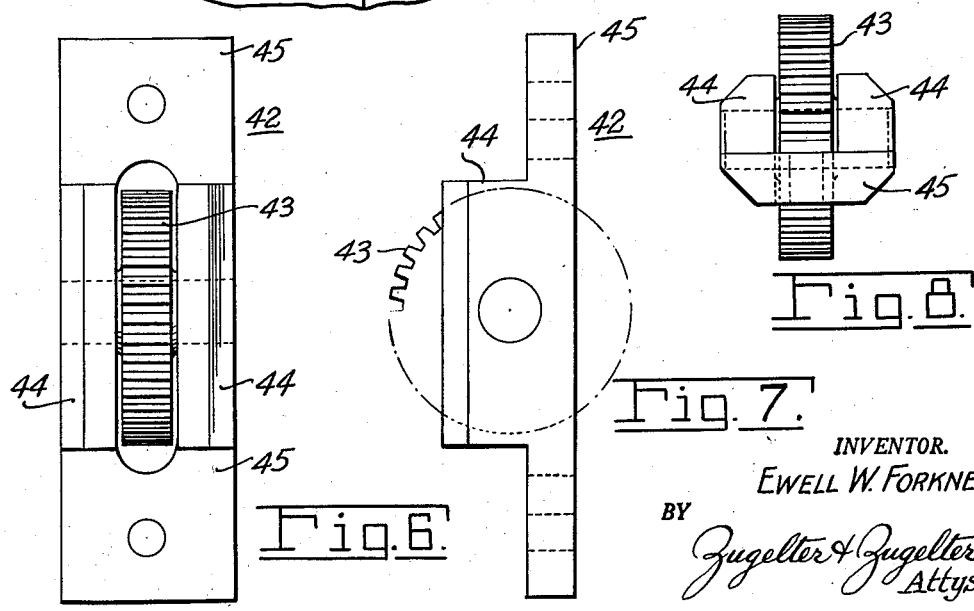
Fig. 6. Fig. 7. Fig. 8.
INVENTOR.
EWELL W. FORKNER
BY
Zugelter & Zugelter
Attys.

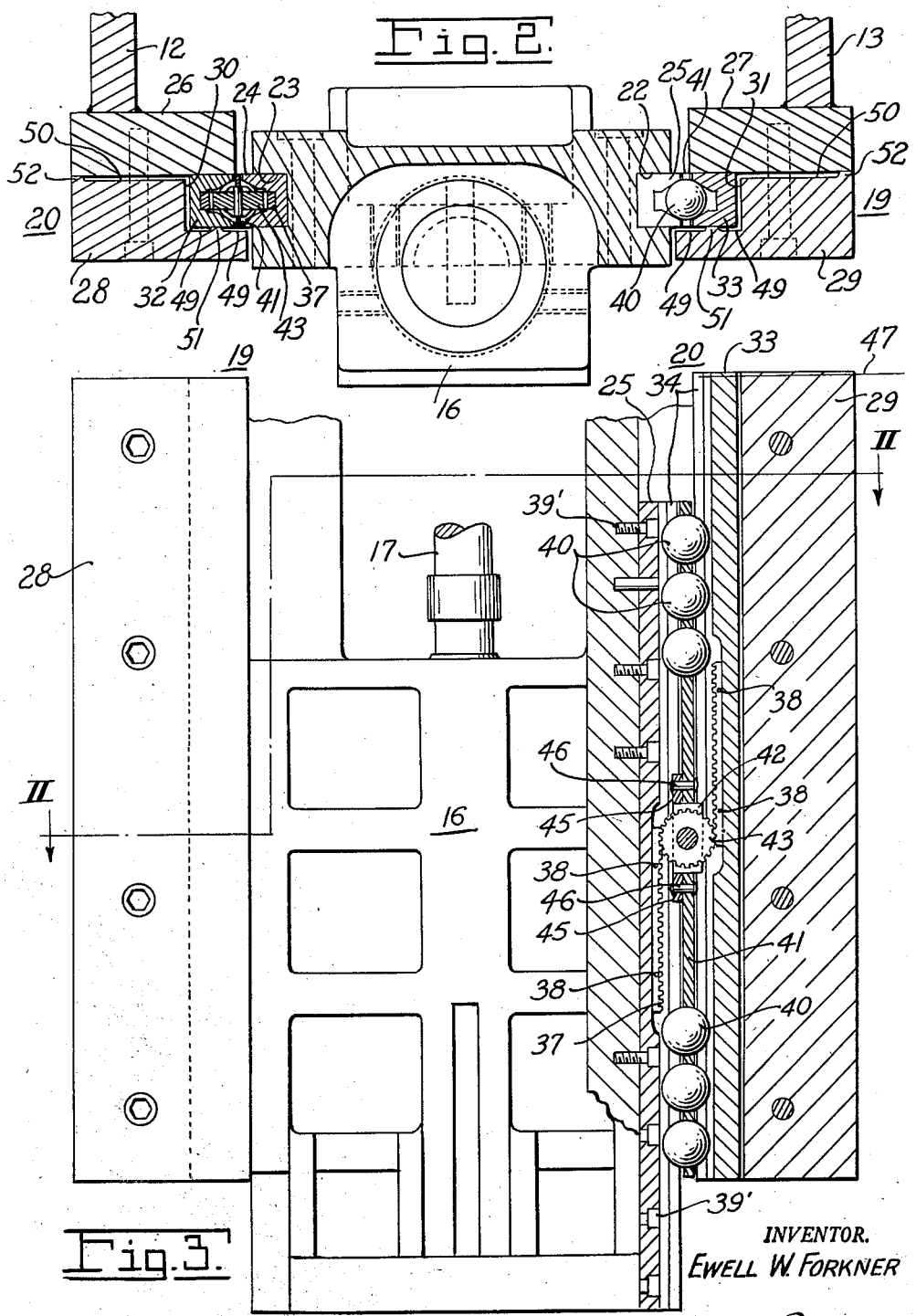

Dec. 30, 1958 E. W. FORKNER 2,866,505
PRESSES FOR PUNCHING AND BLANKING SHEET METAL
Filed April 27, 1953 3 Sheets-Sheet 3
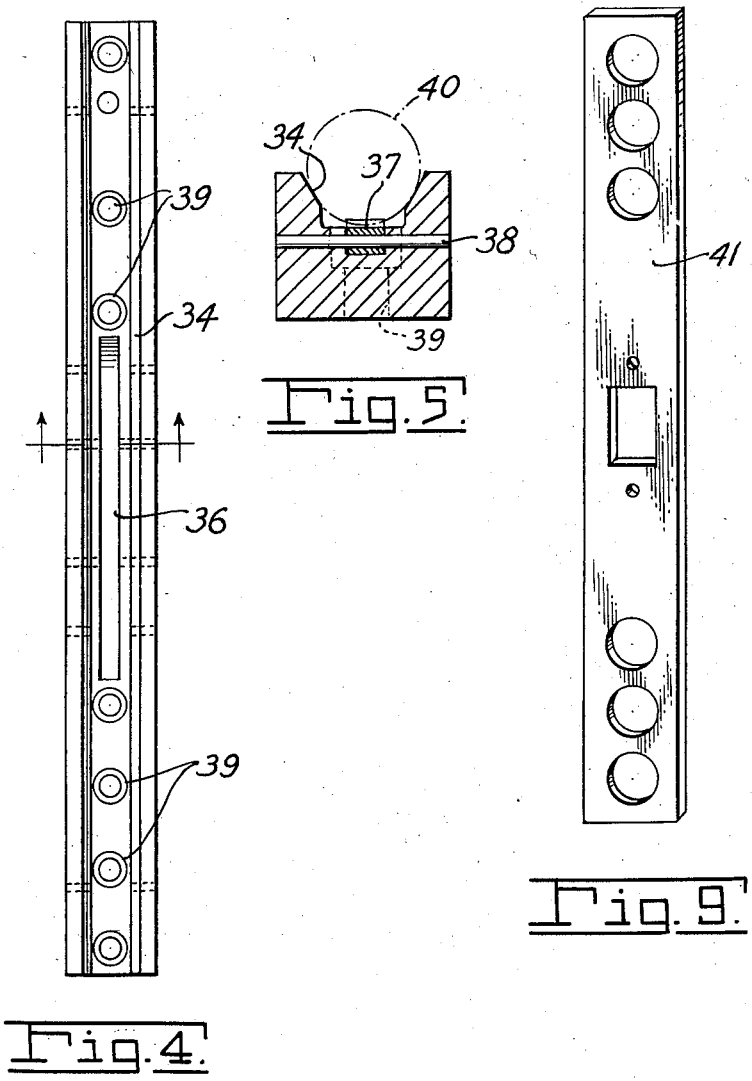
INVENTOR.
EWELL W. FORKNER
BY
Zugelter & Zugelter
Attys.

United States Patent Office 2,866,505
Patented Dec. 30, 1958

2,866,505

PRESSES FOR PUNCHING AND BLANKING SHEET METAL

Ewell W. Forkner, Cincinnati, Ohio, assignor to Precision Welder & Flexopress Corp., Cincinnati, Ohio, a corporation of Ohio Application April 27, 1953, Serial No. 351,159

2 Claims. (Cl. 164—102)

This invention relates to presses designed for punching and blanking sheet metal, and more particularly to anti-friction bearings for the ramways of such presses.

Punch and blanking presses as heretofore constructed have been provided with slide guides or ways for the rams. These guides or ways could not be fitted too tightly because of the high friction that would result. Furthermore, it was difficult to properly so align such ways that side play could be completely taken up. Presses provided with such guides also required heavy rams.

An object of this invention is to provide guide ways that avoid sliding friction with the ram, and which may be so adjusted that alignment of the ways and the ram to close tolerance can be effected.

Another object of the invention is to provide anti-friction guides or ways by which the use of lighter rams and higher speed operation of the presses is rendered both feasible and practicable.

Another object of this invention is to provide ways for the rams of presses with anti-friction bearings.

Another object of the invention is to provide anti-friction bearings of the ball type for the ways of a press as above stated, that are so constructed that the balls are retained in their intended operative positions at all times.

A further object of the invention is to provide the ways of presses with ball bearings which are mounted in a retainer, the retainer being provided with means co-operating with means in the ways for moving the retainers and balls therein in the same direction that the ram moves on its working and return strokes.

Other objects of the invention will be apparent to those having ordinary skill in the art to which it pertains, from the following description and drawings.

In the drawings:

Figure 1 is a view in perspective of a machine having anti-friction bearings for the ways of the ram thereof;

Fig. 2 is a view in section taken on line II—II of Fig. 3;

Fig. 3 is a view in front elevation of that part of the machine which includes the ram and the ways therefor, the ways on one side of the ram being shown in vertical section to illustrate the construction of the anti-friction bearing assembly;

Fig. 4 is a plan view of a bearing plate embodied in the ways shown in Figs. 2 and 3;

Fig. 5 is a view in section taken on line indicated by the arrows in Fig. 4;

Fig. 6 is a plan view of a pinion bracket embodied in the retainer for the ball bearings;

Fig. 7 is a view in side elevation of the device shown in Fig. 6;

Fig. 8 is an end view of the pinion bracket showing the pinion mounted therein;

Fig. 9 is a perspective view of the ball retainer of the bearing; and

Fig. 10 is a view of a rack which is mounted in each of the bearing plates and which co-operates with the pinion.

In Fig. 1, a press 11 for punching or blanking metal is illustrated. The press comprises side frame members 12 and 13 mounted on a suitable base 14, a crank shaft 15 journaled in suitable bearings secured to the side frame members, and a ram 16 connected by a connecting rod 17 to the crank of the shaft and to the ram. A fly wheel 18 is mounted on one end of the shaft, as is customary, and to which the motor drive (not shown) may be connected.

The ram 16 is guided by anti-friction ways 19 and 20 secured to the side frame members, as shown. The details of construction of the ram 16 and the anti-friction ways 19 and 20 are illustrated in Figs. 2, 3, 4 and 5.

As shown in Fig. 2, the opposite edges of the ram 16 are provided with vertical grooves 22 and 23, respectively, in which bearing plates 24 and 25 are secured. Each bearing plate 24 and 25 forms a part of the respective anti-friction ways 19 and 20 of the ram. To the side frame members 12 and 13 are secured vertically extending backing plates 26 and 27, and to these plates removable retainer plates 28 and 29 are secured. As shown, the inner corners of plates 28 and 29, that is, the inner corners adjacent the ram, are provided with right-angled notches 30 and 31, that are complementary to the grooves 22 and 23, respectively, in the ram, and receive bearing plates 32 and 33 of the anti-friction bearing assembly.

The construction of the bearing plates 24, 25 and 32, 33 is illustrated in Figs. 4 and 5. As there shown, each plate is generally rectangular in transverse section and is provided in one face with a truncated V-shaped groove 34. The base of that groove is substantially rectangular, as shown in Fig. 5. In the center of the base of the groove a slot 36 is machined to receive a rack 37. The rack 37 is secured in place by means of pins 38. In the base of the groove, a plurality of counter-sunk holes 39 are provided to accommodate screws 39' for securing the bearing plates to the ram. The bearing plates 32 and 33 are adjustably secured in place by means of the retainer plates 28 and 29.

The angles of the sides of the grooves 34 are of such width as to form tracks for ball bearings 40. The relative sizes of the balls and the grooves are illustrated in Fig. 5, a ball being shown in dotted lines.

The balls are retained in spaced relationship to each other by a strip of metal 41. That strip is provided at its ends with a plurality of apertures in which the balls are received. The diameter of these apertures is such as to provide free movement of the balls within it. At the center of the strip is an aperture for receiving the pinion bracket 42. The pinion bracket and pinion 43 are shown in Figs. 6, 7 and 8. The legs 44 of the pinion bracket pass through the slot in the retainer strip 41 and the wings 45 at the ends of the housing lie flush on the strip. The housing is secured to the strip by screws or rivets 46 passing through the strip and the wings.

As shown in Fig. 3, the axis of rotation of the pinion lies in a plane passing through, approximately, the center of the balls 40. The pinion meshes with the teeth of the racks mounted in the slots 36 in the bearing plates 24, 25 and 32, 33, respectively.

When the ram is reciprocated by rotation of the crank shaft, the pinion 43 is turned by the racks in the bearing plates 24 and 25 of the ram. Since the pinion meshes with the teeth of the racks in the stationary bearing plates 32 and 33 secured to the side frames, the pinion, the retainer strip 41 and the balls 40 travel with the pinion in the same direction as the ram travels. Thus, as shown in Fig. 3, when the ram is at the bottom of its stroke, the retainer strip 41, the balls 40 and the pinion will be in the position shown in full lines in Fig. 3. When the ram has been moved upwardly to the top of its stroke, the uppermost ball 40 will be approximately at the position indicated by line 47.

As illustrated in Fig. 2, the retainer plates 28 and 29 are relieved as at 49 and 50 to provide bearing pads 51 and 52. The pad 51 bears on the stationary bearing plate 33 at approximately the center of the outer face thereof, while pad 52 bears on the plate 27 near its outer edge. Therefore, when the retaining plates 28 and 29 are secured to the backing plates 26 and 27, the pressure exerted on the bearing plates 32 and 33 will be positive throughout the full length thereof, whereby they are firmly secured in their intended positions. Since the plates 28 and 29 are removable, and since the bearing plates 32 and 33 are retained by them, it is possible to so adjust the bearing plates 32 and 33 toward or away from the bearing plates 24 and 25 that the working load on the balls and on the faces of the truncated V grooves may be adjusted as required. The ways of this invention hold the ram against displacement at right angles to the side frame members, and at right angles to the axis of the crank shaft.

By providing the ram of a press, such as shown, with anti-friction or ball bearing ways, it is possible to use rams of light weight metal; to adjust the ways accurately for precise motion; and to minimize the friction load on the press.

Having thus described the invention, what I claim as new and desire to secure by Letters Patent is:

1. As an article of manufacture, a heavy duty high speed precision power punch press comprising a base to support a die member, a pair of side frame members rigidly supported by and extending in a direction away from the base, each of said side frame members including a backing plate, the backing plates of said pair of frame members being spaced to receive therebetween a punch ram and having elongated parallel co-planar flat front faces, an elongated retainer plate mounted on the front flat face of each of the backing plates having a rear face opposing the front face of the backing plate on which it is mounted, one of said plates having a longitudinally extending notch or recessed seat formed in its face to receive a bearing race plate, a bearing race plate mounted in the notch or seat, the retainer plate having transversely spaced projecting bearing pads forming fulcrums for engagement respectively with the backing plate and an associated race plate, adjustable securing means connecting the backing plate and retainer plate at points intermediate the pads of the latter and adjustable to force the pads against the backing plate and bearing race plate to clamp the race plate between said backing and retainer plates in selected adjusted operative position in the notch or seat to prevent displacement thereof under heavy load operating conditions, said race plate having a ball race groove formed in its face opposing the ram and a countersunk rack subtending a longitudinal portion of the groove, a power operated sliding punch ram supported by the side frame members for reciprocation therebetween in a direction toward and from the base, a bearing race plate secured to each side of the ram, each said bearing race plate having a longitudinally extending ball race groove disposed in opposed cooperative relation to the groove of the race plate supported by the adjacent side frame member and a counter-sunk rack subtending a longitudinal portion of the groove, and means intermediate the race plates on the ram and the race plates on the side frame members for accurately maintaining alignment of the ram with respect to the side frame members and prevent lateral bodily displacement or twisting of the ram relative to the side frame members in either a vertical or horizontal plane while minimizing frictional resistance to reciprocation of the ram, said means including as to each pair of opposed race plates a floating ball bearing cage plate disposed between the opposed race plates having centrally mounted thereon a rotatable pinion meshing with the adjacent racks of the side frame and ram bearing plates for determining the effective vertical position of the cage plate for all reciprocated positionings of the ram relative to the side frames, said cage plate having a plurality of ball receiving apertures formed therein in spaced relation to the central pinion, and anti-friction ball bearings freely rotatably mounted in said apertures, said ball bearing being of size jointly to engage at their opposite sides the ball race grooves of the adjacent side frame and ram race plates, whereby adjustment of one or both of the side frame race plates is effective minutely and accurately to determine the transverse adjustment of the ram relative to the base and to pre-load the ball bearings to the extent necessary to eliminate all play, distortion or displacement of the ram in any direction relative to the guiding side frames during reciprocation of the ram.

2. The combination as in claim 1, in which the race grooves of said race plates are of substantially V-shape in cross-section whereby upon tightening of the race plates to pre-load the bearings, the opposed inclined ball contacting faces of the V-shaped races will effectively accentuate in all directions the resistance to twisting displacements of the ram relative to the frame members.

References Cited in the file of this patent

UNITED STATES PATENTS

| Number | Name | Date |
|---|---|---|
| 330,791 | Leavitt | Nov. 17, 1885 |
| 819,270 | Fox | May 1, 1906 |
| 946,438 | Hess | Jan. 11, 1910 |
| 986,809 | Derbyshire et al. | Mar. 14, 1911 |
| 1,466,122 | English | Aug. 28, 1923 |
| 1,603,428 | Tollefson | Oct. 19, 1926 |
| 2,196,605 | Johnson et al. | Apr. 9, 1940 |
| 2,422,774 | Connor | June 24, 1947 |
| 2,422,775 | Connor | June 24, 1947 |
| 2,565,687 | Hoier | Aug. 28, 1951 |
| 2,607,636 | Michelson | Aug. 19, 1952 |

FOREIGN PATENTS

| 404,376 | Italy | June 10, 1943 |